United States Patent [19]

Suzuki

[11] Patent Number: 5,115,531
[45] Date of Patent: May 26, 1992

[54] AIRCRAFT WASHING EQUIPMENT

[75] Inventor: Tsuneo Suzuki, Tokyo, Japan

[73] Assignee: Suzuki Mechanical Engineering Co., Ltd., Tokyo, Japan

[21] Appl. No.: 541,639

[22] Filed: Jun. 21, 1990

[30] Foreign Application Priority Data

Jun. 21, 1989 [JP] Japan .................................. 1-159020

[51] Int. Cl.$^5$ .............................................. B60S 3/06
[52] U.S. Cl. .................................. 15/53.2; 15/DIG. 2
[58] Field of Search ...................... 15/50.3, 53.1, 53.2, 15/88.4, DIG. 2, 53.3

[56] References Cited

U.S. PATENT DOCUMENTS

| | | | |
|---|---|---|---|
| 3,104,406 | 9/1963 | Rhodes | 15/53.1 |
| 3,439,372 | 4/1969 | Collier | 15/53.1 |
| 3,775,798 | 12/1973 | Thornton et al. | 15/53.2 |

Primary Examiner—Philip R. Coe
Assistant Examiner—Reginald L. Alexander
Attorney, Agent, or Firm—Scully Scott Murphy & Presser

[57] ABSTRACT

The present invention provides an aircraft washing equipment, characterized in that it comprises a sub-arm that rotates at the tip of an ascendable and descendable arm by means of a shaft with a base perpendicular to the arm, and is movably controlled by a drive mechanism; a brush oscillating frame rotated by a drive mechanism at the tip of the sub-arm, and which base rotates by means of a shaft perpendicular to the longitudinal direction of the sub-arm and a shaft at the tip of the arm; a brush swivelling frame that is swivelled by a drive mechanism centering around the axis of the longitudinal direction of the brush oscillating frame; a brush arm attached to a hinge on both sides of the brush swivelling frame, disposed bendably in a plane which is parallel to the swivelling plane of the brush swivelling frame, and is bent by a drive mechanism; a center shaft of a rotating brush attached on brackets parallel to the brush swivelling frame and the brush arm, mutually coupled with a universal joint, with their bases on the brush swivelling frame and the brush arm, and protruding perpendicularly to the swivelling plane of the brush swivelling frame; and a drive mechanism to drive the rotating brush around the center axis.

2 Claims, 7 Drawing Sheets

AIRCRAFT WASHING EQUIPMENT

BACKGROUND OF THE INVENTION

This invention relates to a type of aircraft washing equipment for washing large aircraft efficiently.

In the conventional method of washing an aircraft, the pressure applied to an aircraft's surface had to be maintained below a certain value. It was impossible to direct the detergent spray directly on the surfaces. In addition, because aircraft have rounded tops, sides and bellies, washing was time consuming and labor intensive, because the manual brushing of the surfaces was frequently necessary.

Although it does not damage the aircraft body, this conventional method is inefficient. It is becoming increasingly difficult to handle the present volume of aircraft.

SUMMARY OF THE INVENTION

The purpose of this invention is to provide aircraft washing equipment that can wash the outer surface of an aircraft with high efficiency, and yet can be operated by only one person.

The equipment in this invention includes a movable sub-arm at the distal tip of an ascendable and descendable arm which has distal and proximal ends. The arm is controlled by a shaft, the base of which is perpendicular to the arm. This arm is controlled by a drive mechanism. The brush pivoting frame is rotated by a drive mechanism, which is disposed at the distal tip of the sub-arm, the base of which is rotatably disposed by a shaft perpendicularly located in the longitudinal direction of the sub-arm and shaft at the distal tip of the arm. The brush swivelling frame is driven by a drive mechanism which is centered around the axis of the longitudinal direction of the brush pivoting frame. The brush arm is fastened by a hinge on both sides of the brush swivelling frame. It is flexibly fixed in a plane parallel to the swivelling plane of the brush swivelling frame, and is bent by a drive mechanism. The center shaft of the rotating brush (which is fastened flexibly on brackets, a certain distance from and in parallel with the brush swivelling frame) and the brush arm is mutually coupled with a universal joint, whose bases are fixed on the brush swivelling frame and the brush arm, and protrude perpendicularly to the swivelling plane of the brush swivelling frame. The drive mechanism drives the rotating brush around a center axis.

Alternatively, each of the above mechanisms may be mounted on a truck with steerable and rotating wheels, and transversal wheels which are disposed perpendicularly from the fore to the back line of the truck, and protrude downward to release the steerable and rotating wheels from contact with the ground in order to move the truck transversally.

BRIEF DESCRIPTION OF THE DRAWINGS

FIGS. 1 through 8 depict one embodiment of the aircraft washing equipment according to this invention;

DETAILED DESCRIPTION OF PREFERRED EMBODIMENTS

Figure 1:
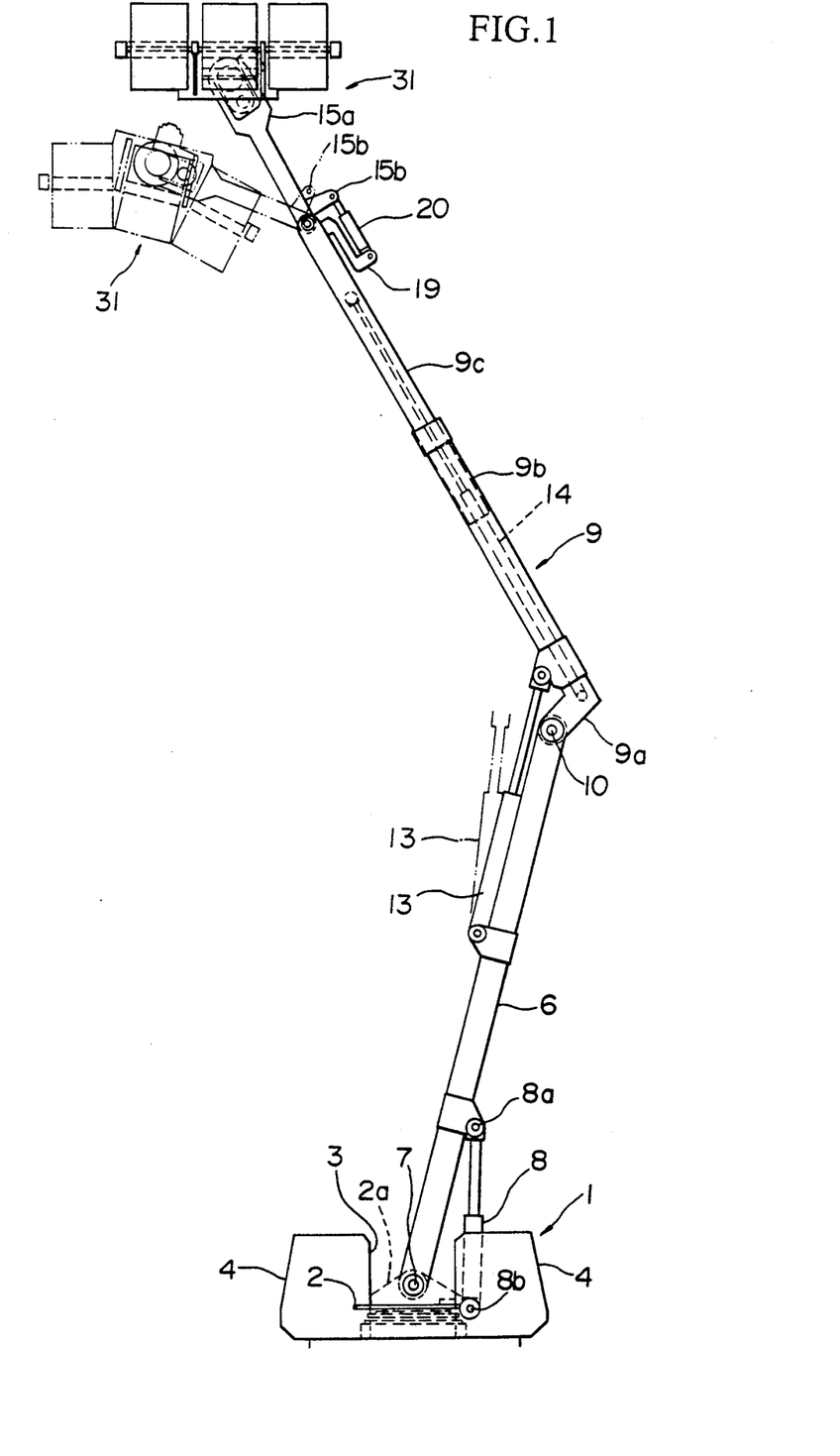
FIG. 1 shows the entire view.
Figure 2:
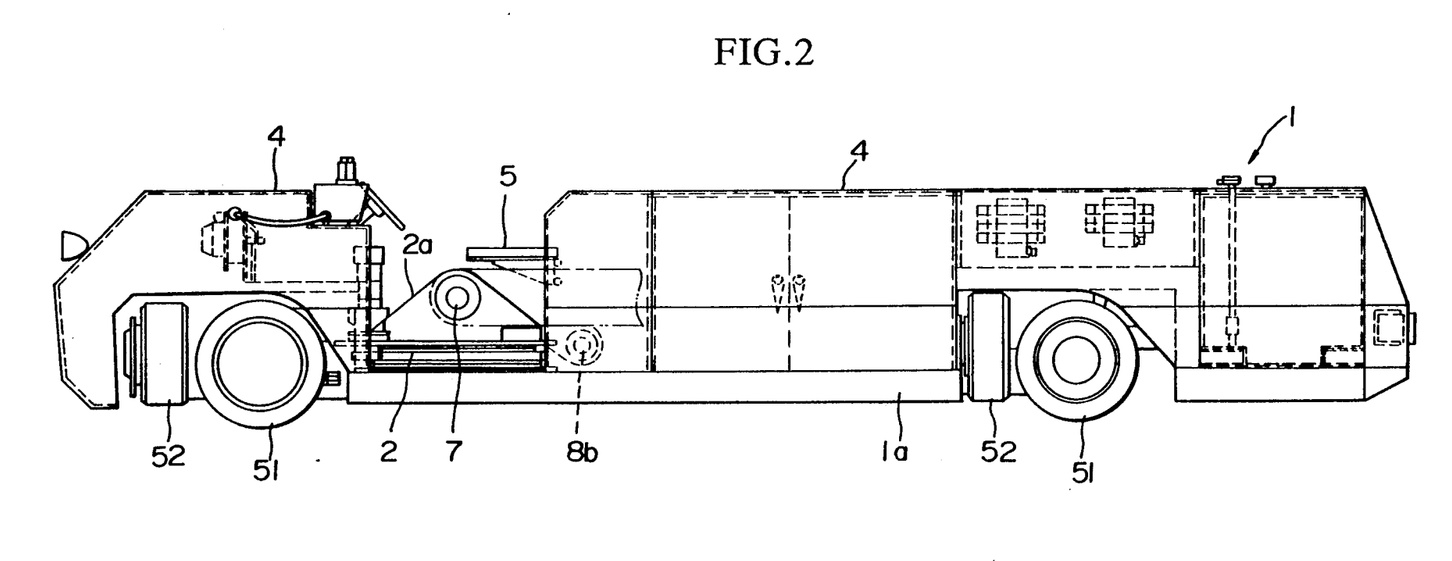
FIG. 2 shows a side view of the truck.
Figure 3:
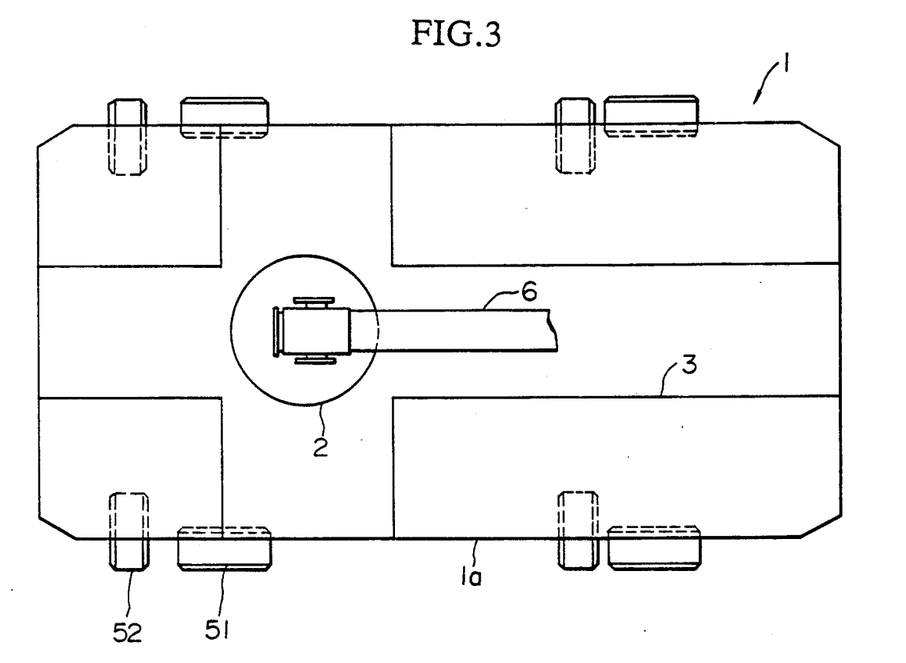
FIG. 3 shows a plan view indicating locations of the truck wheels.
Figure 4:
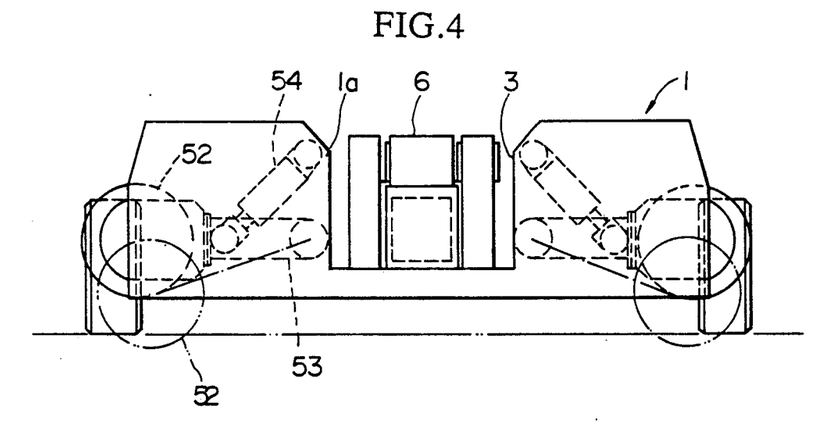
FIG. 4 shows a view of the mechanism which causes the transversal wheels to protrude.

FIGS. 1 through 8 are drawings of one embodiment of the aircraft washing equipment according to this invention, and FIG. 1 is an entire view of the aircraft washing equipment. FIGS. 2 through 4 are drawings of a truck 1 which steerably runs on rotating wheels 51 driven by hydraulic motors. In the vicinity of each of the said rotating wheels 51 are fixed hydraulic motor driven transversal wheels 52 perpendicularly to the fore to back line of the truck 1. These transversal wheels have their bases movably fixed on the truck body 1a, and are located on the ends of the wheel arms 53 which extend to both sides of the truck body 1a. Hydraulic cylinders 54 are arranged near these transversal wheels on the wheel arms 53 and between the upper parts of the wheel arms 53 in the truck body member 1a. These hydraulic cylinders 54 downwardly protrude beyond the transversal wheels 52 to release the rotating wheels 51 from contact with the ground, and retract to return the rotating wheels 51 to the ground.

A swivelling table 2 which swivels horizontally by means of a drive mechanism such as a pinion gear is fixed on the center of the width of the truck 1 in the front part. The width center section of the truck 1 forms a space 3 from front to back, excluding the part for the swivelling table 2. As shown in FIG. 2, on both sides of this space 3, a storage section 4 is present from front to back and from right to left. In front of the operator's seat 5 is the control panel for operating this equipment, as well as the driving equipment for the truck 1. The control panel is connected by means of a cord long enough for the operator to operate the equipment from the operator's seat 5 or even from outside the truck 1. The storage section 4 contains a fuel tank, an engine, a hydraulic pump, an oil tank to operate each part, washing water, a washing tank, washing liquid, a water pump, and an electronic control panel.

Brackets 2a are fixed on a location corresponding to the diameter of the upper surface of the swivelling table 2. The base end of a boom 6 rotates on these brackets 2a with a horizontal shaft 7. Between the lower and intermediate section of the boom 6 and the ends of the brackets 2a on the edge of the swivelling table 2, both ends of a hydraulic cylinder 8 rotate with shafts 8a, 8b parallel to the horizontal shaft 7, as shown in detail in FIG. 5.

Figure 5:
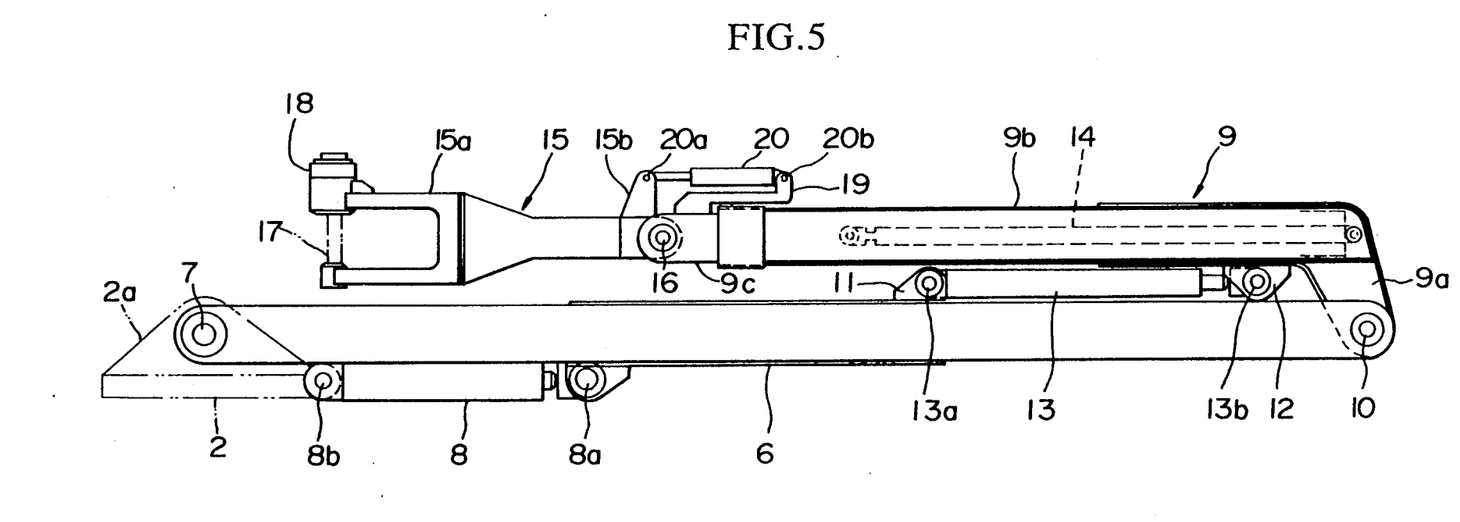
FIG. 5 shows a detailed side view of the boom, arm and their fore and back coupling.

On the tip of the boom 6, the boom 6 and an arm 9 are rotated by a shaft 10 parallel to the horizontal shaft 7, interposed by a bracket 9a installed on the base of the arm 9, so that the boom 6 and the arm 9 are parallel to each other and fixed at a specific distance from each other. Between the boom 6 and the arm 9, there is a hydraulic cylinder 13 which rotates by means of shafts 13a and 13b parallel to the horizontal shaft 7 on the brackets 11 and 12 which have both ends fixed to the upper and intermediate sections of the boom 6 and to the base of the arm 9.

The arm 9 comprises an outer arm 9b and an inner arm 9c which extends telescopically, between which there is a hydraulic cylinder 14 which drives them telescopically.

On the tip of the inner arm 9c, the base of the sub-arm 15 with its tip forming a "U" shaped fitting 15a rotates by means of a shaft 16 parallel to the horizontal shaft 7. The "U" shaped fitting 15a is formed so that a drive shaft 17, which extends beyond the tip, will be perpendicular to the longitudinal direction of the sub-arm 15 and the shaft 16. On the outer side of one of the legs of the "U" shaped fitting 15a, the driving hydraulic motor 18 rotates to drive the drive shaft 17.

In addition, on the end of the inner arm 9c and the base of the sub-arm 15 are brackets 19 and 15b, on which a hydraulic cylinder 20 is fixed. Both ends of the cylinder are rotated by means of shafts 20a and 20b parallel to the horizontal shaft 7.

Figure 6:
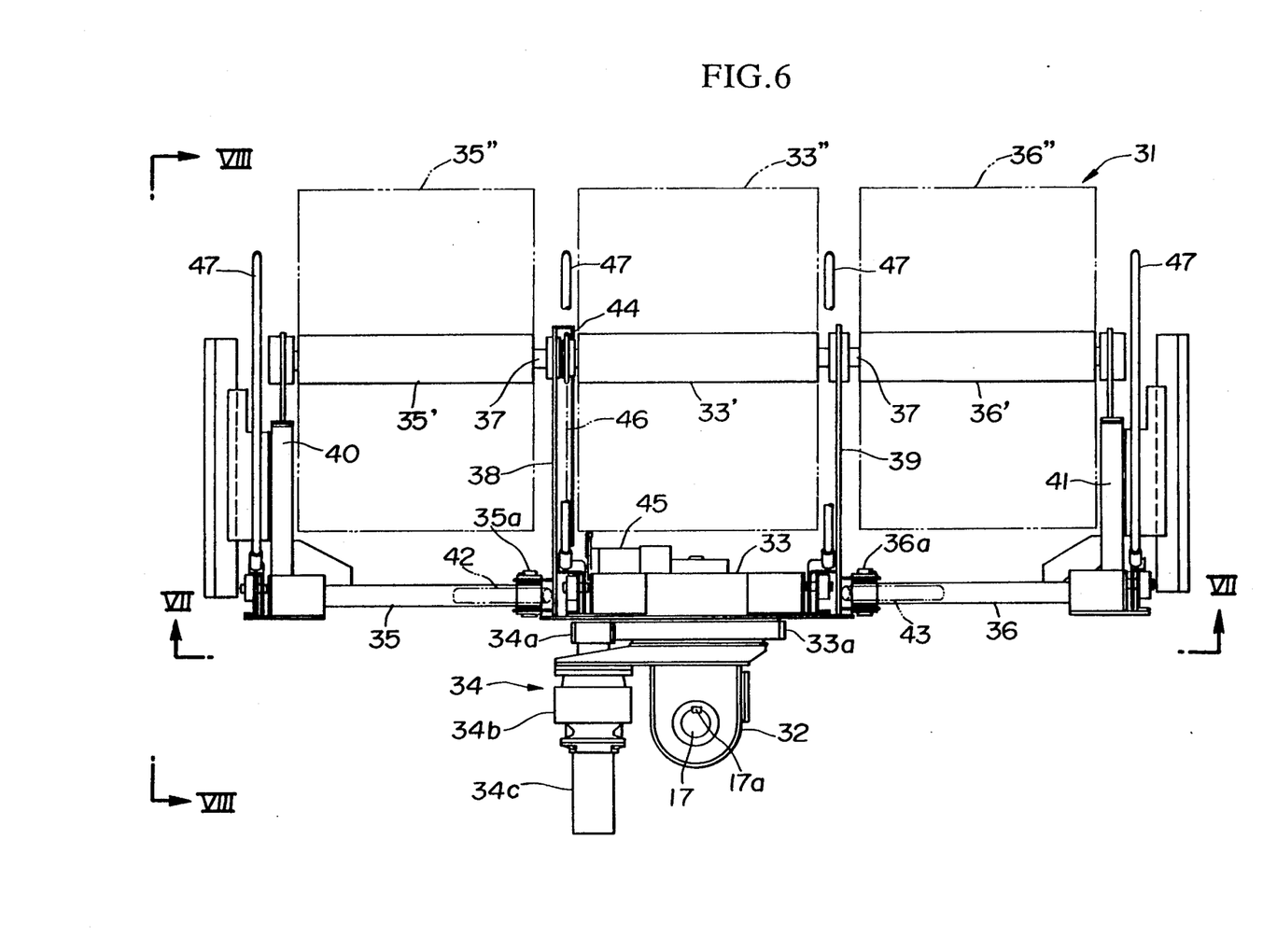
FIG. 6 shows a side view of the washing brush.
Figure 7:
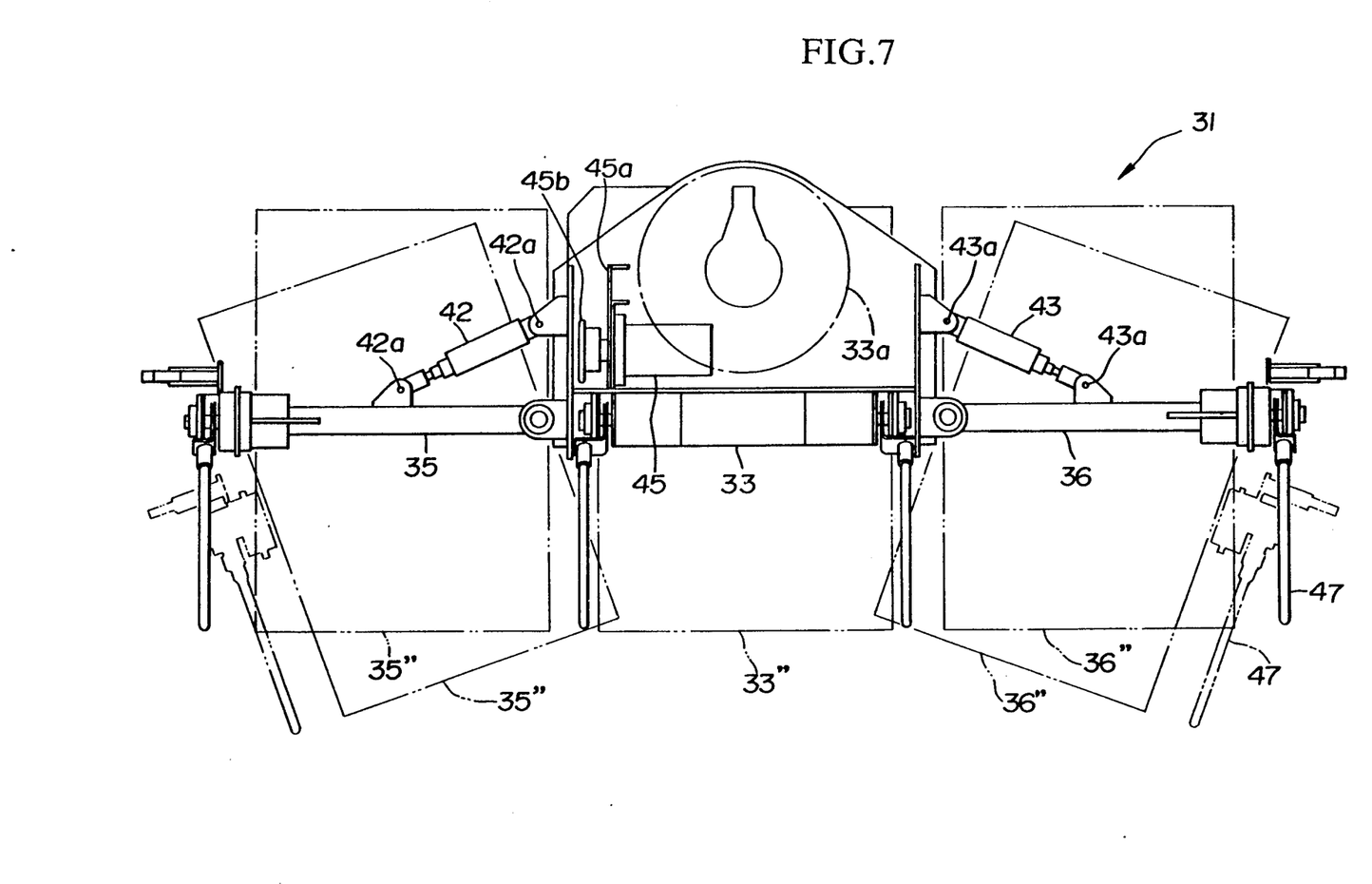
FIG. 7 shows an expanded view of the part indicated by lines VII—VII in FIG. 6.
Figure 8:
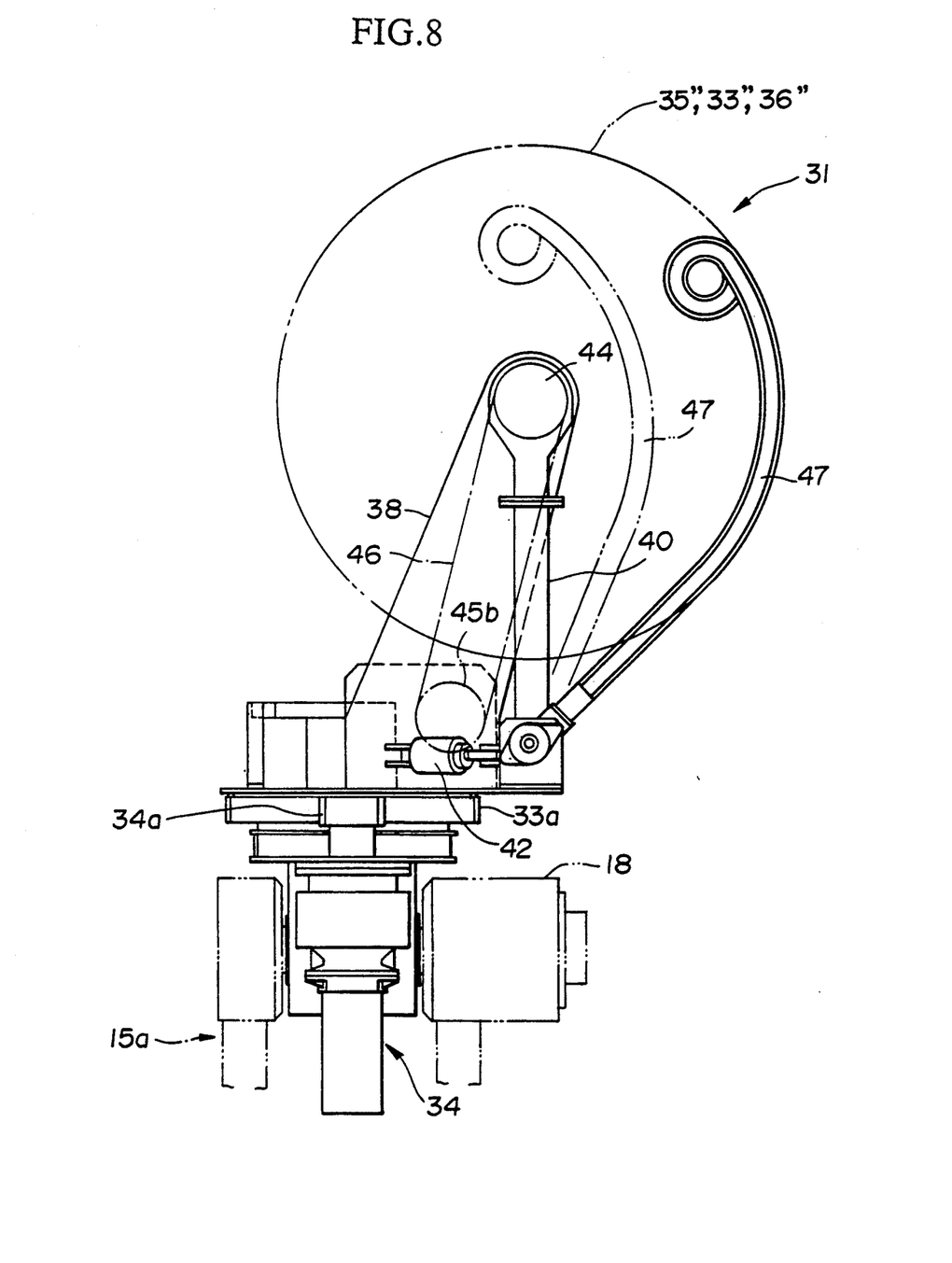
FIG. 8 shows an expanded view of the part indicated by lines VIII—VIII in FIG. 6.

The "U" shaped fitting 15a is connected to the washing brush 31 shown in FIGS. 6 through 8. The washing brush 31 is structured as follows:

The "U" shaped fitting 15a holds the base of a brush pivoting frame 32, with an inserted drive shaft 17. The stopper pin 17a prevents movement relative to the drive shaft 17. On the end of this brush pivoting frame 32, there is a rotatable gear 33a rotating around the longitudinal axis of the brush pivoting frame 32. A brush swiveling frame 33 is fixed on this gear 33a, in the direction of the diameter of the gear 33a. A small gear 34a, which engages the gear 33a, and a swivelling drive mechanism 34, comprising a hydraulic motor 34c rotated by reduction gears 34b, are fixed on the side of the brush pivoting frame 32.

Brush arms 35 and 36 are fixed on both ends of the brush swiveling frame 33. These arms are within the plane on which the brush swivelling frame 33 swivels on hinges 35a and 36a. Parallel brush rotating shafts 33', 35', and 36' are provided at a certain distance from the brush swiveling frame 33 and the brush arms 35 and 36 respectively. These are coupled by universal joints 37. Both ends of the brush rotating shaft 33' have their bases fixed on both ends of the brush swivelling frame, rotate on the tips of the drive bracket 38 and support bracket 39, and protrude into the swivelling plane of the brush swivelling frame 33. The tips of the brush rotating shafts 35', 36' have their bases fixed on the end of the brush arms 35 and 36, and rotate on the tips of the support brackets 40 and 41 which protrude parallel to the brackets 38 and 39.

Between the brackets 38 and 39 on both ends of the brush swivelling frame 33 and the intermediate section of the brush arms 35 and 36 are hydraulic cylinders 42 and 43, which rotate by means of shafts 42a and 43a, both ends of which protrude parallel to the brackets 38 and 39.

In addition, on the tip of the drive bracket 38 is a sprocket 44 fixed on the brush rotating shaft 33', and a sprocket 45b of a hydraulic motor 45, which is fixed on the brush swivelling frame 33 by a fixing table 45a, is wound with a roller chain 46. Furthermore, the brush swivelling frame 33 and the brush arms 35 and 36 have jetting openings not shown, to jet out washing liquid and washing water, on brushes 33", 35", and 36" on the brush rotating shafts 33', 35', and 36'.

In the figure, part 47 is a sensor used to control the positions of the brushes relative to an aircraft surface.

Next, explanations are given on how to use the aircraft washing equipment.

When the aircraft washing equipment is not in use, the truck is housed in a garage with the arm 9 retracted by the hydraulic cylinder 14; the washing brush 31 is rotated upward to make the brush rotating shafts 33', 35', and 36' rest parallel to the arm; the swivelling table 2 with the hydraulic cylinder 8 is behind the boom 6; the hydraulic cylinder 8 and the hydraulic cylinder 13 are contracted to compact the boom 6 and the arm 9 in the space 3 extending from fore to aft of the truck 1, one lying over the other.

To wash an aircraft with this equipment, an operator first confirms that the fuel, washing liquid and water tanks are filled, then drives the truck 1 on the rotating wheels 51 near to the aircraft to be washed. Next, the operator extends the steering of the wheels 51 and the hydraulic cylinder 54 to make the truck 1 ride on the transversal wheels 52, then drives it to the washing position.

Then the operator uses the control panel in front of the operator's seat 5 to extend the hydraulic cylinders 8, 13, and 14 and swivels the swivelling table 2 to place the washing brush 31 close to the surface of the aircraft to be washed. Next, the operator moves the brushes 33", 35", and 36" to fit the surface of the aircraft, by moving the sub-arm 15 using the extension and contraction of the hydraulic cylinder 20, pivoting the brush pivoting frame 32 using the drive hydraulic motor 18, swivelling the brush swivelling frame 33 using the swivelling drive mechanism 34, and bending the brush arms 35, 36 using the hydraulic cylinders 42 and 43. After this setting, the system is switched to automatic operation. Switching to automatic operation will rotate the brushes 33", 35", and 36" and supply the washing liquid or water to the brushes. A signal from the sensor 47 automatically controls each drive mechanism for the sub-arm 15 and the washing brush section 31, causing the brushes 33", 35", and 36" to follow the contour of the surface at a prescribed face pressure.

The range that the parts farther from the sub-arm 15 can follow is large. In addition, because the positions of the washing brush section 31 can be altered by operating the boom 6, the arm 9 and the swivelling table 2, the ability of the washing brush section 31 to follow the contour makes it easy to wash a larger area if face fitting is conducted on the respective faces.

The truck is moved if the washing brush section 31 can no longer reach a washing area even after maximum operation of the boom 6, the arm 9 and the swivelling table 2. In this case, the truck with the running wheels 51 and the transversal wheels 52 can be easily moved.

Thus, once the whole surface of an aircraft is divided into several blocks and face fitting is conducted on the surface of the respective blocks, the washing brush section 31 follows each face to wash the surface easily, thereby enabling one operator to wash easily the surface of a large aircraft.

Further, the equipment can enlarge its washing area with only one face fitting by automatically controlling the whole system, including the drive of the boom 6, the arm 9 and the swivelling table 2.

Moreover, because the truck 1 with the transversal wheels 52 and the running wheels 51 can move easily and precisely, it is possible to omit the swivelling table 2, by directly installing the base of the boom 6 so that it can rotate on the top of the truck 1.

What is claimed is:

1. A device for washing aircraft comprising:
   a raisable and lowerable arm extending from said device having proximal and distal tip portions;

a sub-arm having proximal and distal portions, the proximal portion of said sub-arm being pivotally attached to the distal tip portion of the raisable and lowerable arm to enable the sub-arm to pivot in a plane within which the raisable and lowerable arm is displaceable;

a first driving mechanism having two attachment points on either of two ends thereof, one of said ends being pivotally attached to the distal end of said raisable and lowerable arm and the other end of which is pivotally attached to the proximal portion of the sub-arm for driving the sub-arm so as to pivot about the distal tip portion of the raisable and lowerable arm;

a brush pivoting frame having a base pivotally attached to the distal portion of the sub-arm, the base of the brush pivoting frame being pivotable in a plane which is perpendicular to said plane within which the raisable and lowerable arm travels;

a second driving mechanism mounted on the distal end of the raisable and lowerable arm mechanism being engaged with the brush pivoting said drive frame by a drive shaft for driving the base of the brush pivoting frame so as to pivot about the distal portion of the sub-arm;

a brush swiveling frame swivelably attached to the base of the brush pivoting frame, the brush swiveling frame being able to swivel about the base of the brush pivoting frame in a plane which is perpendicular to said plane within which the base of the brush pivoting frame pivots;

a third driving mechanism being attached to the brush pivoting frame and a shaft operatively connecting the drive mechanism to the brush swiveling frame for driving the brush swiveling frame so as to swivel the swiveling frame about the base of the brush pivoting frame;

a pair of brush arms hinged to both ends of the brush swiveling frame, the brush arms being bendable in a plane which is parallel to said plane within which the brush swiveling frame swivels;

a park of fourth driving mechanisms each having two ends with one end of each attached to the brush swiveling frame and the other end of each attached to each of two brush arms for driving the brush arms to bend the brush arms;

a plurality of rotating brushes each having a center shaft, each of the center shafts being attached to the brush swiveling frame or the brush arms via a bracket so as to be parallel to the corresponding swiveling frame or the brush arms, the center shafts of the rotating brushes being mutually coupled with each other via universal joints so that the rotating brushes can rotate simultaneously; and a fifth driving mechanism mounted on the brush swiveling frame and including a sprocket mounted on an output shaft of the fifth driving mechanism in operable communication with a roller chain and a sprocket connected to the center shaft for driving the rotating brushes about the center shaft in synchrony.

2. The device as claimed in claim 1, wherein the device is mounted on a truck having a longitudinal axis, the truck including first wheels and second wheels, the first wheels being able to travel over a level surface along the longitudinal axis of the truck and being steerable, the second wheels being able to travel perpendicularly to the longitudinal axis of the truck, the second wheels also being able to protrude downward so that the first wheels are released from contact with the level the surface, whereupon the second wheels can travel over the level surface.

* * * * *